United States Patent
Teramoto et al.

(10) Patent No.: US 7,208,109 B2
(45) Date of Patent: Apr. 24, 2007

(54) METHOD OF PREPARING COMPOSITE FROM RIGID POLYMER SOLUTION AND COMPOSITE FILM

(75) Inventors: Yoshihiko Teramoto, Tsuruga (JP); Seiji Watanuki, Otsu (JP); Hiroki Murase, Otsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 482 days.

(21) Appl. No.: 10/472,948

(22) PCT Filed: Mar. 25, 2002

(86) PCT No.: PCT/JP02/02818

§ 371 (c)(1),
(2), (4) Date: Sep. 26, 2003

(87) PCT Pub. No.: WO02/079306

PCT Pub. Date: Oct. 10, 2002

(65) Prior Publication Data

US 2004/0056381 A1   Mar. 25, 2004

(30) Foreign Application Priority Data

Mar. 29, 2001  (JP) ............... 2001-96723

(51) Int. Cl.
*B29C 67/00* (2006.01)
(52) U.S. Cl. .............. 264/134; 264/232; 264/250; 264/331.11
(58) Field of Classification Search .............. None
See application file for complete search history.

(56) References Cited

U.S. PATENT DOCUMENTS

| 4,359,567 A | 11/1982 | Evers ........................ 528/179 |
| 4,533,692 A | 8/1985 | Wolfe et al. ................ 524/417 |
| 4,533,693 A | 8/1985 | Wolfe et al. ................ 524/417 |
| 4,533,724 A | 8/1985 | Wolfe et al. ................ 528/313 |
| 4,578,432 A | 3/1986 | Tsai et al. ................... 525/432 |
| 4,703,103 A | 10/1987 | Wolfe et al. ................ 528/179 |
| 5,292,469 A | 3/1994 | Bowman et al. ............ 264/169 |
| 5,302,334 A * | 4/1994 | Pierini et al. ............... 264/233 |
| 5,328,654 A | 7/1994 | Dixit ........................ 264/289.3 |
| 5,367,042 A | 11/1994 | Pierini et al. ............... 528/183 |
| 5,552,221 A | 9/1996 | So et al. ..................... 428/373 |
| 5,788,888 A * | 8/1998 | Cohen et al. ................. 264/28 |

FOREIGN PATENT DOCUMENTS

| EP | 0 296 823 | 12/1988 |
| JP | 63-210138 | 8/1988 |
| JP | 09-124833 | 5/1997 |

OTHER PUBLICATIONS

S. J. Picken: Clearing Temperatures of Aramid Solutions in Sulfuric Acid, MACROMOLECULES, vol. 22, pp. 1766-1771, 1989.
H. Fischer, J.A. Odell, A. Keller, M. Murray, et al.: The Phase Diagram of the System PBZT/Polyphosphoric Acid/Water, J. Materials Science, vol. 29, pp. 1025-1030, 1994.
Song, Hyun Hoon, "Chain Coherence Length of Ridid-Rod Poly (p-phenylene benzobisthiazole) and Derivatives", *Journal of Polymer Science: Part B: Polymer Physics*, vol. 37, 1999, pp. 661-666.
Song, Hyun Hoon, et. al., "Preparation of rigid-rod poly(p-phenylene benzobisthiazole) films of single crystalline texture", *Polymer*, vol. 38, No. 16, 1997, pp. 4241-4245.

* cited by examiner

*Primary Examiner*—Edmund H. Lee
(74) *Attorney, Agent, or Firm*—Kenyon & Kenyon LLP

(57) ABSTRACT

A method of preparing a precursor for a composite having wet strength of 2 to 50 kgf/mm² and a mean surface void diameter of 0.01 to 2 μm by molding a solution of a rigid polymer having a concentration of 1 to 1.3 times the optical anisotropy lower limit solution concentration C2, thereafter rendering the solution non-flowable by absorbing a coagulant under a condition causing no solvent extraction and thereafter extracting the solvent, and a method of preparing a molecular composite having a mean thickness of 2 to 200 μm by impregnating this precursor for a composite with a solution of a polymer or reactive molecules.

4 Claims, No Drawings

METHOD OF PREPARING COMPOSITE FROM RIGID POLYMER SOLUTION AND COMPOSITE FILM

RELATED APPLICATIONS

This is a 371 application of PCT/JP02/02818 filed on 25 Mar. 2002, claiming priority to Japanese Application No. 2001-096723 filed on 29 Mar. 2001, the entire contents of which are incorporated herein by reference.

TECHNICAL FIELD

The present invention relates to a technique for preparing a composite material having high strength and a high elastic modulus or high heat resistance.

BACKGROUND ART

A solution of a rigid polymer, the so-called liquid-crystalline polymer, allows preparation of a highly oriented molding having high strength and a high elastic modulus due to such properties that molecular chains are readily oriented in the direction of flow and a long time is required to randomly direct the molecular chains once the same are oriented. Further, the rigid polymer can provide a heat-resistant molding due to a high glass transition temperature.

A rigid polymer, particularly polybenzazole polymer dissolves only in limited mineral acids such as methanesulfonic acid and polyphosphoric acid. Such a polymer is generally molded from either a low-concentration mineral acid solution of not more than 2% or a high-concentration mineral acid solution of at least 14% such as that described in Example of Japanese Patent Laying-Open No. 63-210138. When worked into fiber or a film of a simple body of polybenzazole, the polymer is molded from a high-concentration liquid crystal dope described in U.S. Pat. No. 5,552,221 or U.S. Pat. No. 5,367,042. When a composite containing a polymer network of polybenzazole as a reinforcer is prepared from such a high-concentration liquid crystal dope, open space in the polymer network are so reduced that it is difficult to homogeneously impregnate other components. When the polymer network is prepared from a low-concentration solution of not more than several percent, it follows that a large quantity of mineral acid is used for manufacturing a product, unsuitably for an industrial process. In order to prepare a composite containing a polymer network of a heat-resistant rigid polymer as a reinforcer, therefore, a technique absolutely different from that for a conventional rigid polymer molding is necessary.

As to a rigid polymer composite, a method of molding the same from a starting material of a blend or a copolymer with a flexible polymer such as polyamide or polyetherketone has been studied. With this method, however, no high-performance material making the best use of the characteristics of the rigid polymer has not yet been put into practice under the present circumstances.

On the other hand, Japanese Patent No. 2,522,819 describes an invention related to a composite prepared by previously molding a continuous porous network body of an aromatic heterocyclic polymer and impregnating the same with binder resin. With this method, however, it is so difficult to obtain a homogeneous continuous porous network body having large voids that no composite material having satisfactory performance can be obtained.

The present invention relates to a technique for preparing a high-performance composite material by molding and coagulating a solution of a rigid polymer for forming a polymer network and impregnating voids thereof with a functional polymer or an inorganic matrix excellent in compressive strength.

DISCLOSURE OF THE INVENTION

The present invention consists of the following structures:

A method of preparing a precursor for a composite by molding a solution of a rigid polymer having a concentration of 1 to 1.3 times the optical anisotropy lower limit solution concentration C2, thereafter rendering the solution nonflowable by absorbing a coagulant under a condition causing no extraction of solvent and thereafter extracting the solution.

The method of preparing a precursor for a composite described above, characterized in that the solution is a mineral acid solution of a polybenzazole polymer.

A method of preparing a molecular composite by impregnating the precursor for a composite described above with a solution of a polymer or reactive molecules.

A precursor for a composite having wet strength of 2 to 50 kgf/mm$^2$.

The precursor for a composite described above, characterized in that the mean void diameter on the surface is 0.01 to 2 μm.

A molecular composite having a mean thickness of 2 to 200 μm prepared by impregnating a precursor having wet strength of 2 to 50 kgf/mm$^2$ with a solution of a polymer or reactive molecules.

The molecular composite described above, having strength of 1 to 100 kgf/mm$^2$.

The present invention is now described in detail.

As to the rigid polymer in the present invention, such a substance that all molecular chains are constituted by rigid units, a substance prepared by copolymerizing a flexible monomer between rigid units, a substance prepared by bonding a rigid unit to a crank mold, a material prepared by arranging spacers on side chains of rigid main chains or the like can be utilized. Polyparaphenylene terephthalamide, polybenzimide, polyparaphenylene and polybenzazole (PBZ) denotes polybenzoxazole (PBO) homopolymer, polybenzothiazole (PBT) homopolymer and polybenzimidazole (PBI) homopolymer or random, sequential or block copolymers of the PBO, PBT and PBI. Polybenzoxazole, polybenzothiazole and random, sequential or block copolymers thereof are described in Wolfe et al., "Liquid Crystalline Polymer Compositions, Process and Products", U.S. Pat. No. 4,703,103 (Oct. 27, 1987) "Liquid Crystalline Polymer Compositions, Process and Products", U.S. Pat. No. 4,533,692 (Aug. 6, 1985), "Liquid Crystalline Poly (2.6-Benzothiazole) Composition, Process and Products", U.S. Pat. No. 4,533,724 (Aug. 6, 1985) and "Liquid Crystalline Polymer Compositions, Process and Products", U.S. Pat. No. 4,533,693 (Aug. 6, 1985), Evers, "Thermo-oxidatively Stable Articulated p-Benzobisoxazole and p-Benzobisthiazole Polymers:, U.S. Pat. No. 4,359,567 (Nov. 16, 1982), Tasi et al., "Method for Making Heterocyclic Block Copolymer", U.S. Pat. No. 4,578,432 (Mar. 25, 1986) and the like.

A structural unit included in the polybenzazole polymer is preferably selected from lyotropic liquid crystal polymers. A monomer unit consists of any monomer unit described in structural formulas (a) to (h), and more preferably, essentially consists of a monomer unit selected from the structural formulas (a) to (d).

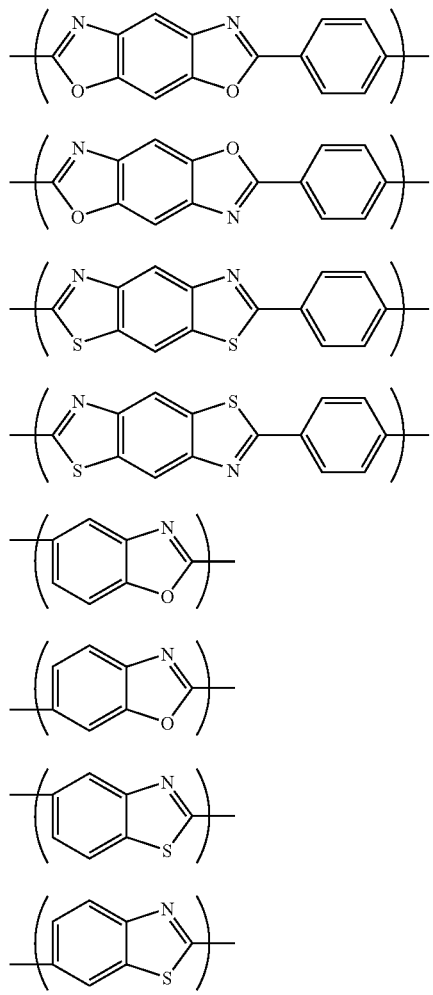

A solution of such a rigid polymer forms an optical anisotropic solution when exceeding a phase transition concentration C*. A preferable solvent for forming the optical anisotropic solution contains non-oxidizing acid capable of dissolving cresol or its polymer. Mineral acids such as polyphosphoric acid, methanesulfonic acid and high-concentration sulfuric acid or mixtures thereof can be listed as examples of a particularly preferable acid solvent. The phase transition concentration C* for developing optical anisotropy depends on the temperature. This fact is also described in Picken (Macromolecules Vol. 22, pp. 1766–1771, 1989). According to the present invention, the concentration for forming an anisotropic phase including no isotropic phase at the maximum temperature from adjustment of the solution up to molding is important. A liquid crystal phase and an isotropic phase coexist at the phase transition concentration C*. Such phases are extremely inferior in flowability, to allow no molding. The lower and upper limit concentrations of the region where the isotropic phase and the liquid crystal phase coexist are defined as C1 and C2 respectively. The feature of the present invention resides in molding of a solution having a concentration in the range of the lower limit concentration C2 to a level of 1.3 times the concentration C2 causing no appearance of the isotropic phase at the maximum temperature from preparation of the solution up to molding. A more preferable concentration range is between the concentration C2 and a level of 1.2 times the concentration C2, more preferably between the concentration C2 and a level of 1.1 times the concentration C2.

It is convenient to decide the concentration C2 by observation with a polarization microscope. Alternatively, the concentration C2 may be decided by a method of measuring fluid viscosity (e.g., H. Fischer, J. A. Odell, A. Keller, M. Murray et al., J. Materials Science, Vol. 29, p. 1025). In observation with a polarization microscope, a sample is crushed to a thickness of not more than about 50 µm between slide glasses and observed on a heating stage. A concentration/composition not causing disappearance of a pattern resulting from optical anisotropy is studied in a temperature range of at least the melting temperature up to a working temperature from solution adjustment. The lower limit concentration C2 varies with the type of the solvent, the moisture content of the solvent and the degree of polymerization of the polymer. In the case of a 116% polyphosphoric acid of polyparaphenylene benzbisoxazole having an intrinsic viscosity number of 25, for example, the liquid crystal formation lower limit concentration C2 at 200° C. is about 8 percent by weight.

Another advantage of reducing the solution concentration resides in reduction of intermolecular interaction in the solution. The intermolecular interaction is increased between optical anisotropic solutions having different concentrations if the concentrations are high. The optical anisotropic solution arises from a poly-domain structure of a nematic liquid crystal. If the solution concentration is high, intermolecular repulsion in the domain becomes strong to increase elasticity of the domain itself and strengthen inter-domain interaction (scientifically referred to as long-range order). Such a solution is rich in elasticity, readily results in instable flowage in molding and readily causes surface irregularity of a molding. Therefore, it is preferable to mold a solution having the lowest possible concentration exceeding the concentration C1.

A step of molding the solution is now described.

The optical anisotropic solution can be worked into a film, fiber or a bar by heating the same to a temperature exceeding the softening temperature, extruding the same from a slit die or a capillary and cooling the same on a support. When preparing a film, it is preferable to add draw as described in U.S. Pat. No. 5,328,654. A shaped solution must be swollen with a coagulant to be brought into a state having no flowability in advance of extraction of the solvent. When dipped in the coagulant as in a general step for fiber or a film, the solvent quickly diffuses in the coagulant to cause remarkable volume change of the molding. At this time, a polymer network of the rigid polymer starts packing, to form a dense molding. According to this system, it is impossible to impregnate voids of the polymer network with a matrix component. According to the present invention, therefore, the coagulant is absorbed in the molding for progressing coagulation. The coagulant may be prepared from a spray of a liquid phase or vapor-phase gas.

With the solution concentration according to the present invention, it is also possible to employ generally known casting, pressing or the like as another method.

The polymer network structure resulting from coagulation depends on the quantity of the applied coagulant, the temperature of the molding in coagulation and the ambient pressure. Preferable conditions are those progressing coagulation as quick as possible in the range of a temperature time product not extremely progressing hydrolysis of the polymer. While a high-temperature high-pressure water vapor atmosphere is particularly preferable, the temperature is preferably reduced after treatment of the shortest possible time. The preferable treatment time, depending on the volume of the molding, is four hours at the longest, and more preferably not more than two hours.

A wet film, i.e., a precursor obtained in the aforementioned manner exhibits unprecedented strength of 2 to 50 kgf/mm$^2$, preferably 3 to 10 kgf/mm$^2$. If the strength is not more than 2 kgf/mm$^2$, handling is so hard that no strength appears also when a composite film is prepared. The strength is controlled by controlling molecular orientation in the film.

Preferable kinds of coagulants are water, alcohol, glycol, acetone etc. Water or acetone is preferable for a system employing polyphosphoric acid or sulfuric acid as the solvent. Water is advantageous for industrial application. The coagulant may be mixed with a base for neutralizing the acid of the solvent. Coagulation can be quickened by utilizing basic gas such as ammonia.

When a mixture of the solvent and the coagulant collects on the surface of the molding in coagulation, the solvent is quickly dissolved in this portion to unpreferably locally accelerate coagulation. In order to eliminate such inconvenience, the coagulant must be injected through a porous film or air blow must also be employed for removing droplets from the surface of the molding. A network structure of a rigid chain polymer can be obtained by solvent extraction from the molding sufficiently coagulated in the aforementioned manner. The step of the extraction results in volume change. Abrupt volume change destabilizes the form of the molding, and hence it is preferable to perform solvent extraction with an extractant, slowly eluting the solvent, which makes restraint and contraction on the surface of the support. In a restrained state during extraction, orientation of the polymer network may be reinforced or it may be possible to reinforce surface orientation of a sheet material. In any extraction method, it is important to select a condition improving impregnation of the matrix component.

Solvent extraction must be continued until the quantity of the solvent remaining in the polymer is sufficiently reduced. It is particularly preferable to utilize a high-temperature extractant such as that in U.S. Pat. No. 5,292,469. In the case of a molding from a polyphosphoric acid solution of polybenzazole, a preferable residual solvent quantity is not more than 0.6% in the weight of phosphorus atoms, more preferably not more than 0.4%. The quantity is most preferably not more than about 0.3%. If the quantity of the residual solvent is large, hydrolysis is readily caused by acid of the solvent to deteriorate long-term stability of the reinforced network.

The mean void diameter of the obtained polymer is 0.01 to 2 μm, more preferably 0.05 to 1 μm. If the mean void diameter is not more than 0.01 μm, impregnation with the resin is so difficult that it takes time to replace the solvent for creating the composite film and the replacement may be insufficient. If the mean void diameter exceeds 2 μm, film strength may be reduced. This mean void diameter is controlled by controlling the coagulation time or the coagulation temperature.

A step of preparing a composite material from the rigid polymer matrix obtained in the aforementioned manner starts with preparation of impregnating the same with a solution of the matrix component. If the extractant cannot dissolve the matrix component, the extractant is replaced with a solvent for the matrix. At this time, inorganic particulates of colloidal silica or the like may be added in order to prevent collapse of the polymer network. It is efficient to perform operation such as that of blowing ambient attached excess extractant with air or the like before or during solvent replacement. Replacement of the solvent is preferably progressed from a single surface or an end. At this time, the replacement can be accelerated by positively fluidizing the liquid or performing suction for accelerating the flow.

In an exemplary composite film employing silica for the matrix, the reinforced network subjected to extraction with water is replaced with methanol and this molding is dipped in an alcoholic solution of tetraethyl silicate and an amine catalyst so that alcohol is not dried therefrom, to be vacuum-degassed at the room temperature. A composite of silica and a rigid polymer can be prepared by wiping off a surplus treatment liquid from the surface and fixing the molding to a round frame for drying the same at 200° C. to 350° C.

The thickness and the strength of a composite obtained in the aforementioned manner were 2 to 200 μm and 1 to 100 kgf/mm$^2$ respectively.

The rigid polymer network prepared according to the present invention is utilizable as (1) a reinforcer for a proton exchange film for a polyelectrolyte fuel cell, (2) a separator for a cell such as a nickel-hydrogen cell or a lithium ion cell or an electrode material, (3) a composite molding with thermosetting bismaleimide, (4) a wiring board material combined with a low dielectric constant polymer, (5) a hard glass-containing composite material, (6) water purifying/drain filter, (7) a filter for blood filtration, (8) a filter material for blood filtration/separation, (9) a bag filter, (10) an ion exchange film, (11) a catalyst carrier film for photocatalyst or enzyme, (12) an ink cartridge, (13) an ink picture sheet, (14) a gas adsorbent, (15) a chromatographic column, (16) a refractory/heat insulating material, (17) an apatite-forming substrate such as artificial bone, (18) a drug delivery system such as a sustained release iatric carrier, (19) an artificial lung, (20) a heat insulating material for an aircraft or space application, (21) a durable cushioning material or the like.

BEST MODE FOR CARRYING OUT THE INVENTION

While Examples are now described, the present invention is not restricted to these Examples.

<Method of Measurement>

(Intrinsic Viscosity) was measured with a methanesulfonic acid solvent at 25° C.

(Mean Void Diameter)

The mean void diameter is measured with a scanning electron microscope. However, a coagulant must be removed in order to make observation with a scanning electron microscope, while it is necessary to make evaluation in a state as close to the original state provided with the coagulant as possible. Therefore, each sample was dried in a state maintaining a filmy form by a critical point drying technique and observed with a scanning electron microscope. The procedure is now described in detail.

A solution is molded into a film by the aforementioned method and rendered non-flowable by absorbing a coagulant under a condition causing no extraction of solvent, and the coagulant is thereafter replaced with isoamyl acetate. Each sample is cut out into the size of 5 mm square with a knife or the like. If the coagulant and isoamyl acetate are poor in solubility, the coagulant is temporarily replaced with a common solvent with isoamyl acetate, and the common solvent is thereafter replaced with isoamyl acetate. This replacement is performed not by simultaneous dipping in the replacement solvent but by successive dipping in a mixed solution whose replacement solvent concentration is increased stepwise. After the coagulant is completely replaced with isoamyl acetate, isoamyl acetate is replaced with liquid carbon dioxide through a critical point dryer HCP-1 by Hitachi, and subjected to critical point drying through prescribed operation according to the user instruction. A metal is vapor-deposited on the surface of each sample subjected to critical point drying, in order to provide conductivity. The deposited metal can be prepared from Pt or Au. Each sample prepared in the aforementioned manner is photographed through a field-emission scanning electron microscope S-800 by Hitachi in 30,000 magnifications. This photography is executed not on both surfaces of a composite precursor but on a surface recognized as having a larger number of openings through previous observation. Photographs of 30,000 magnifications are obtained from arbitrary five portions of the surface having a larger number of openings. While the term "arbitrary portions" denotes portions selected at random if the surface of the composite precursor has a homogeneous opening structure, the surface of the sample of 5 mm square is divided into 25 regions of 1 mm square if the surface is heterogeneous for taking 25 photographs of 30,000 magnifications in total from the central portions of the regions respectively. In the obtained photographs, the diameter R1 of the maximum opening in the field is measured. Also as to the remaining photographs, the diameters R2, R3 and R4 to R25 of the maximum openings in the respective fields are obtained. If any of the maximum openings is out of round, the longest and shortest diameters thereof are measured for employing the average thereof. It is assumed that the mean opening diameter R is obtained as follows:

When there is no heterogeneity:

$R=(R1+R2+R3+R4+R5)/5$

When there is heterogeneity:

$R=(R1+R2+R3+\ldots+R24+R25)/25$

<Strength>

It is assumed that film strength is measured in a state impregnated with the coagulant. Test pieces of 5 mm in width and 20 mm in length are created with a knife while preventing the sample from drying. At this time, at least two test pieces are created to include two types of test pieces having longitudinal directions parallel and perpendicular to the long sides of composite precursors respectively. The test pieces are mounted on a general tensile tester, for executing a tensile test with a gage length of 10 mm and an elongation velocity of 20 m/min. and obtaining breaking strength. While the type of the used tensile tester is not limited so far as a load cell used therein is proper, TENSILON UTM-II by Toyo Sokki Kabushiki Kaisha or the like, for example, can be employed. The test pieces are prevented from drying also during the tensile test. As to the, measurement, it is assumed that at least two, more preferably at least five test pieces of each of two types of test pieces having different orientations of major axes are measured for employing the average thereof as strength.

<Thickness>

The thickness necessary for calculating breaking strength is measured in the state impregnated with the coagulant. The thickness is measured on four peripheral portions and a central portion of the composite precursor with a micrometer while preventing the coagulant from drying, and the average thereof is regarded as the thickness. Also as to a molecular composite, the average of values similarly measured on five portions with a micrometer is regarded as the thickness.

<State Impregnated with Resin>

The state impregnated with the resin is executed by observing a section with an optical microscope. The molecular composite is embedded in epoxy resin and cured overnight at 60° C., for thereafter exposing the section with a microtome. If it is difficult to enclose the molecular composite with the epoxy resin due to thermal denaturation of matrix resin or the like, the molecular composite is embedded in ultraviolet-curing resin or visible light-curing resin at a temperature not more than the room temperature. The exposed section is observed with a metallurgical microscope (OPTIPHOTO by Nikon Corporation).

EXAMPLE 1 AND COMPARATIVE EXAMPLES 1 TO 4

Poly-paraphenylene-cis-benzbisoxazole polymer solutions having concentrations of 1, 6, 8, 11 and 14% respectively with solvents of polyphosphoric acid having concentrations of 116% were polymerized in flasks of 2 L. The concentrations of anhydrous phosphoric acid were adjusted in charging for equalizing the concentrations of the solvents to each other. Prepared dopes were held between slide glasses, temperature-controlled through a Linkam hot stage and observed in cross nicol fields with a polarization microscope (ECLIPSE E600 POL by Nikon). It was confirmed that an anisotropic phase partially disappeared to provide a mixed phase state with an isotropic phase with the concentration of 6% (comparative example 1). With the concentrations of at least 8%, most fields kept optical anisotropy also when the temperatures were increased to 300° C. These solutions with these polyphosphoric acid concentrations were held between Teflon sheets of 0.3 mm in thickness and pressed into spacer thicknesses of 150 microns with a press under a pressure of 2.5 MPa in terms of areas of the spread dopes. The temperature of pressing plates was set to 150° C., so that the dopes were pressed under a prescribed pressure for five minutes, thereafter cooled through the pressing plates circulated in cooling water of 18° C. and taken out.

The Teflon sheets were separated from each taken-out dope sheet, which in turn was cut into a size of 250 mm square, placed on a dry clean glass plate, introduced into a thermo-hygrostat of 60° C. having relative humidity of 85%, coagulated for 45 minutes and thereafter placed on calendered melt blow unwoven fabric, which in turn was wound on the outer side of a smooth stainless spool having a diameter of about 100 mm so that an end thereof was fixed with a band. This spool was rinsed with warm water of 35° C. for two hours, for obtaining a precursor for a composite.

In order to confirm open space of such desolvated moldings, samples of 3 mm square were cut out from the moldings so that water was replaced with acetone and thereafter replaced with epoxy resin (LUVEAK 812/LU-VEAK-MNA/LUVEAK-DMP-30=100/89/0.1 mixture), and coagulated in silicon rubber molds of 2 mm in thickness and 5 mm in diameter. Acetone replacement and epoxy resin replacement were performed in three stages for successively increasing the concentrations. These coagulated epoxy resin composites were cut with a diamond knife, for observing polymer networks with a metallurgical microscope (OPTIPHOTO by Nikon). In the molding obtained from the 6% solution, defects constituted by only epoxy resin were found in a large number of voids having diameters of several 100 microns passing through the film. In the molding obtained from the 8% solution, a homogeneous and excellent composite of a polymer network and epoxy resin was formed. The composite (comparative example 2) obtained from the solution having the concentration of 11% and the composite (comparative example 3) obtained from the solution having the concentration of 14% were thin with small quantities of impregnation into matrices. PBO-rich skin layers were formed on the surfaces, and the quantities of inwardly impregnated resin were extremely small.

EXAMPLE 2 AND COMPARATIVE EXAMPLES 5 TO 7

Precursors were created by a method identical to that for Example 1 and comparative examples 1 to 4 except that each of poly-paraphenylene-cis-benzbisoxazole polymer solutions having concentrations of 6, 8, 11 and 14% with solvents of polyphosphoric acid having concentrations of 116% was pressed, thereafter separated from Teflon sheets, held between two undrawn polypropylene films and thereafter subjected to simultaneous two-way drawing at 135° C. in drawing magnifications of three times in the vertical and horizontal directions.

EXAMPLES 3 AND 4 AND COMPARATIVE EXAMPLES 8 TO 10

Filmy solutions obtained by preparing poly-paraphenylene-cis-benzbisoxazole polymer solutions having concentrations of 6, 8, 11 and 14% with solvents of polyphosphoric acid having concentrations of 116% and extruding the same from a slit nozzle of 0.2 mm in slit width and 45 mm in slit length at a temperature of 140 to 180° C. were coagulated/rinsed similarly to Example 1 and comparative examples 1 to 4 to obtain precursors. In Example 4, a filmy dope was held between undrawn polypropylene films, subjected to two-way drawing and thereafter similarly coagulated/rinsed to obtain a precursor. With the concentrations of 11 and 14% higher than the concentration C2, extrude from the nozzle was so instable that it was impossible to obtain excellent filmy solutions.

If the concentration is less than the liquid crystal formation lower limit concentration C2, the dope is so poor in flowability in working that a large number of void defects result in the molding. Further, it is understood that open space in the polymer network are so reduced in size that the same cannot be excellently impregnated with matrix resin with the concentration of 11% exceeding 1.3 times the liquid crystal formation lower limit concentration C2.

EXAMPLE 5

The precursor film of Example 1 was replaced with a 5% dimethyl acetamide solution of a 6FDA–4BDAF polymer expressed in the following chemical formula, obtained from 2,2-bis(3,4-dicarboxyphenyl)hexafluoropropane dianidride (6FDA) and 2,2-bis[4-(4-aminophenoxy)phenyl]hexafluoropropane (4BDAF), fixed to a frame to be dried at 110° C. for two hours and thereafter dried at 260° C. for 30 minutes.

The thickness of the finished composite was 25 μm.

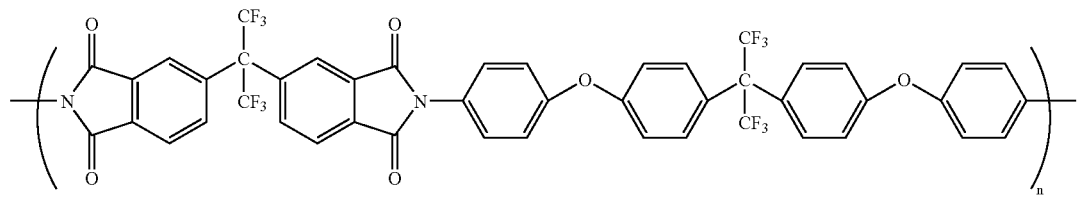

According to the present invention, not only a highly heat-resistant electronic substrate material having a low dielectric constant and high strength but also a material applicable to each of the aforementioned applications can be prepared.

|  | Method of Film Formation | Polymer Concentration of Solution (%) | Intrinsic Viscosity of Polymer | Thickness of Composite (μm) | Void Defect of Matrix | Resin Impregnation State in PBO Network | Draw Ratio | Strength (kgf/mm$^2$) | Mean Void Diameter on Surface (μm) |
|---|---|---|---|---|---|---|---|---|---|
| Comparative Example 1 | pressing | 1 | 28.1 | 10 | none | excellent | not drawn | 0.1 | 2.5 |
| Comparative Example 2 | pressing | 6 | 26.4 | 29 | numerous | excellent | not drawn | 0.2 | 1.1 |
| Example 1 | pressing | 8 | 26.2 | 28 | none | excellent | not drawn | 2.1 | 0.9 |
| Comparative Example 3 | pressing | 11 | 25.8 | 24 | none | slightly impregnated | not drawn | 2.5 | not more than 0.01 |
| Comparative Example 4 | pressing | 14 | 26.4 | 20 | none | heterogeneous | not drawn | 1.5 | not more than 0.01 |
| Comparative Example 5 | drawing after pressing | 6 | 26.4 | 11 | numerous | excellent | 3 × 3 | 0.3 | 0.9 |
| Example 2 | drawing after pressing | 8 | 26.2 | 13 | none | excellent | 3 × 3 | 4.3 | 0.7 |
| Comparative Example 6 | drawing after pressing | 11 | 25.8 | 11 | slightly observed | slightly impregnated | 3 × 3 | 4.5 | not more than 0.01 |
| Comparative Example 7 | drawing after pressing | 14 | 26.4 | 9 | slightly observed | heterogeneous | 3 × 3 | 3.9 | not more than 0.01 |

-continued

|  | Method of Film Formation | Polymer Concentration of Solution (%) | Intrinsic Viscosity of Polymer | Thickness of Composite (μm) | Void Defect of Matrix | Resin Impregnation State in PBO Network | Draw Ratio | Strength (kgf/mm$^2$) | Mean Void Diameter on Surface (μm) |
|---|---|---|---|---|---|---|---|---|---|
| Comparative Example 8 | extrude from nozzle | 6 | 19.6 | 38 | numerous | excellent | not drawn | 1.1 | 0.7 |
| Example 3 | extrude from nozzle | 8 | 19.8 | 42 | none | excellent | not drawn | 8.2 | 0.5 |
| Example 4 | extrude from nozzle | 8 | 19.8 | 20 | none | excellent | 3 × 3 | 15.3 | 0.3 |
| Comparative Example 9 | extrude from nozzle | 11 | 20.5 | no film formable | — | — | — | — | — |
| Comparative Example 10 | extrude from nozzle | 14 | 22.1 | no film formable | — | — | — | — | — |
| Example 5 | pressing | 8 | 26.2 | 25 | none | excellent | not drawn | 2 | 0.9 |

INDUSTRIAL APPLICABILITY

According to the present invention, it is possible to prepare a high-performance composite material useful to a reinforcer for a proton exchange film for a polyelectrolyte fuel cell, a separator for a cell such as a nickel-hydrogen cell or a lithium ion cell or an electrode material with respect to a molecular composite material employing a rigid polymer of a type workable with only a specific solvent such as strong acid by a method impregnating a precursor of only the rigid polymer with another matrix component.

The invention claimed is:

1. A method of preparing a precursor for a composite by molding a solution of a rigid polymer having a concentration of 1 to 1.3 times the optical anisotropy lower limit solution concentration C2, thereafter rendering the solution non-flowable by absorbing a coagulant under a condition causing no extraction of solvent, and thereafter extracting the solvent.

2. The method of preparing a precursor for a composite according to claim 1, wherein the solution is a mineral acid solution of a polybenzazole polymer.

3. A method of preparing a molecular composite by impregnating the precursor for a composite according to claim 1 with a solution of a polymer or reactive molecules.

4. The method of preparing a precursor for a composite according to claim 1, wherein the precursor has a wet strength of 2 to 50 kgf/mm$^2$ and a mean void diameter on the surface of 0.01 to 2 μm.

* * * * *